March 25, 1958 E. T. BURTON 2,828,071

SELECTABLE BASE COUNTER

Filed Dec. 27, 1951 2 Sheets-Sheet 1

INVENTOR
E. T. BURTON
BY R. O. Covell
ATTORNEY

INVENTOR
E. T. BURTON
BY
R. O. Covell
ATTORNEY 2,828,071

SELECTABLE BASE COUNTER

Everett T. Burton, Millburn, N. J., assignor to Bell Telephone Laboratories, Incorporated, New York, N. Y., a corporation of New York Application December 27, 1951, Serial No. 263,598

18 Claims. (Cl. 235—92)

This invention relates to counters, and more particularly to counters operable on any selectable base.

An object of this invention is the rapid and accurate counting of a series of events.

Another object of this invention is the counting of a series of events on any selectable base.

A feature of this invention is an equipment for selectively controlling the input to a plurality of serially connected scale-of-two stages so that incoming events are counted to any selected base.

The conventional binary counter comprises a plurality of serially connected bistable or trigger circuits. Since each such circuit normally has two stable conditions or states, the base or cycle of a binary counter of "*n*" stages is, normally, $2^n$, i. e., $2^n$ input pulses are required to step the system through one complete cycle of operation and return it to its initial condition. The cycle or base of a conventional binary counter can, therefore, be only an integral power of the digit 2.

In accordance with the principles of this invention, a binary counter may be adapted to count on a cycle, or to a base, which may be any integral number. This departure is accomplished by means of internally controlled input switching, in a manner described in deteail hereinafter.

Certain meanings should be attached to certain terms wherever they occur herein. In general, a counter is customarily said to comprise a plurality of stages. Each stage normally comprises an electronic device or devices and associated circuitry whereby the entity is capable of assuming at least two alternate stable states or conditions. If the stage has but two stable states, one is customarily labeled the "off" or "0" state and the other the "on" or "1" state. With a plurality of such stages serially connected, and with all of the stages in any given initial state or condition, the system will return to that initial condition after a certain number of input events have been received. This number is referred to as the base or cycle of the counter.

A counter comprising a plurality of stages may also be said to comprise a plurality of sections, each of the sections comprising one or more stages. Wherever, in discussing a "section," reference is made to the "first" and to the "last" stages of that section, it is to be understood that since under some circumstances a section may consist of but one stage, the expressions "first stage" and "last stage" may refer to the same stage.

A complete understanding of the nature and principles of the invention may be obtained from the following detailed description of preferred embodiments thereof, when read with reference to the accompanying drawings, in which.

Figure 1:
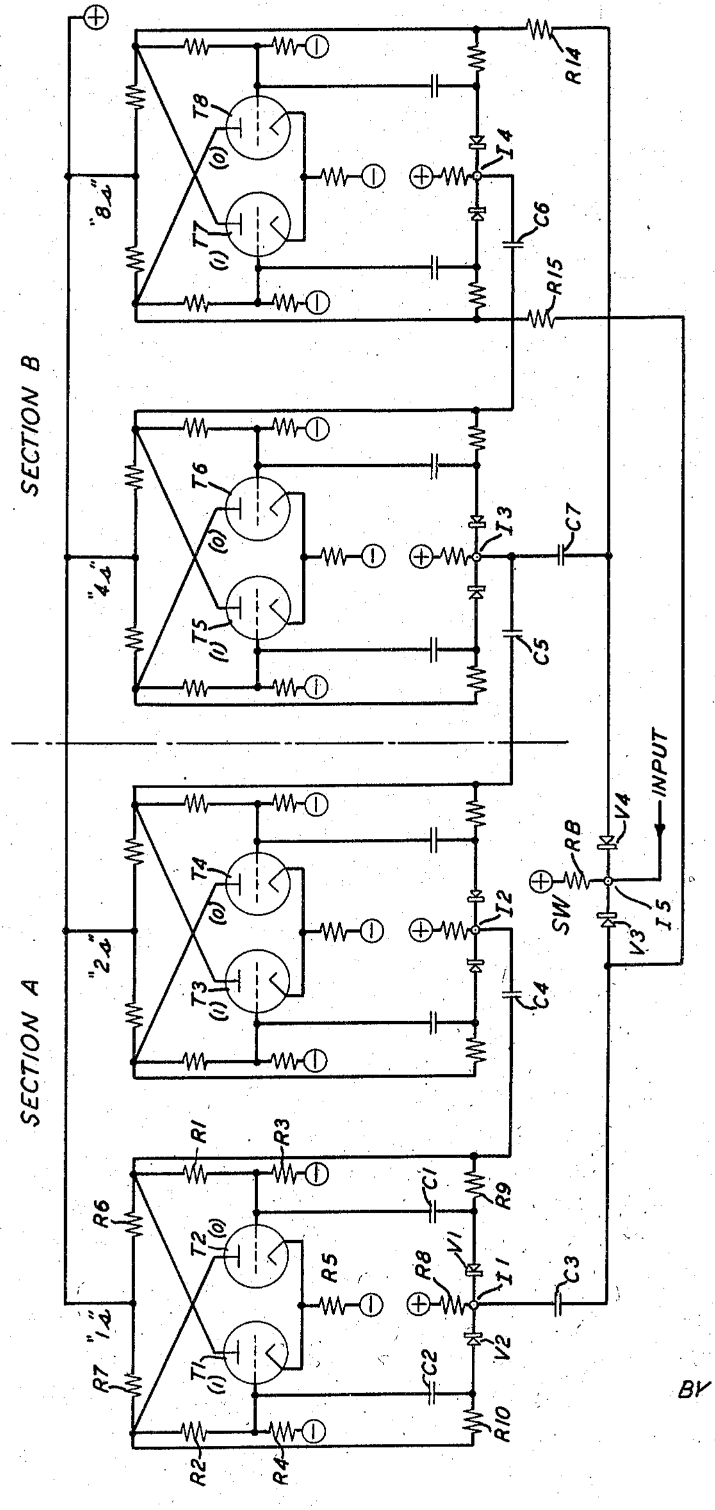
Fig. 1 is a representation of a binary decade circuit embodying the principles of the invention.

Fig. 1 of the drawings is a representation of a two-section four-stage counter arranged to count on a base of 10. Section A comprises the first or "1s" stage and the second or "2s" stage; section B comprises the third or "4s" stage and the fourth or "8s" stage. Each stage comprises that which is variously referred to as a trigger circuit, a "flip-flop," a binary circuit, or a bistable circuit. The basic circuit utilized as a stage in the embodiment of the invention shown in Fig. 1 is a modification of the well-known Eccles-Jordan trigger circuit as disclosed in British Patent 148,582, accepted August 5, 1920, and as shown, for example, in a variety of forms in "Theory and Applications of Vacuum Tubes," by Herbert J. Reich. One form of that trigger circuit, as shown, for example, as the first stage of Fig. 1, comprises two triodes T1 and T2 with the anode of each tube coupled to the control grid of the other by a resistor R1 or R2. Correct operating grid voltages are maintained by means of resistors R3 and R4, the cathodes being either grounded or connected to a suitable source of potential via common resistor R5. If it be assumed that triode T1 is conducting and triode T2 is non-conducting, and if a negative pulse be momentarily applied to the grid of triode T1, the anode current of that tube will be reduced whereby the anode potential of tube T1 will rise due to the reduced potential drop across resistor R6. This rise in anode potential is communicated primarily through resistor R9 and capacitor C1, which present a relatively low impedance to the transient, to the control grid of triode T2, causing an increase of anode current in tube T2. The anode voltage of triode T2 will be reduced as a result of the increased potential drop across resistor R7, and this decrease in potential is transmitted primarily through resistor R10 and capacitor C2 to the control grid of triode T1. This action is cumulative, continuing until triode T1 is non-conductive and triode T2 is conducting. The trigger circuit will remain stabilized in this condition until a negative pulse is applied to the control grid of the conducting triode, at which time the circuit will transfer to the other stable state. It may be noted that the values of resistance R9 and capacitor C1 and of resistance R10 and capacitor C2 are so selected as to couple the anode of each of the tubes to the control grid of the other during the transient periods, thereby effectively shortening the transient intervals. The static condition of the trigger circuit in either of its two stable states is maintained by the application of direct potentials to the control grids through resistors R1 and R2.

In the several forms of trigger circuits normally used in the art, the input pulse is applied to both triodes. The trigger circuits shown in Fig. 1 further embody a switching means for directing the negative input pulses only to the more positive of the two control grids. This means comprises, for example, varistors V1 and V2. The characteristics of device V1 or V2 are such that a negative pulse applied through capacitor C3 will be blocked or passed by device V1 or V2 in accordance with the bias applied to that device. A suitable positive potential is applied through resistor R8 to that terminal of each of the devices V1 and V2 which is connected to the common input point I1. The other terminal of device V1 is connected to the anode of triode T1 through resistor R9; the other terminal of device V2 is connected to the anode of triode T2 through resistor R10. Since the voltage between the anodes of the two triodes T1 and T2 is substantially constant in amplitude but reversible in polarity, and since the devices V1 and V2 are connected series opposed, one of the devices V1 or V2 is conductive while the other is blocked in either steady-state condition. The poling of devices V1 and V2 is such (assuming negative input pulses) that the conductive one is connected through resistor R9 or R10 to the more positive anode, i. e., to the anode of the non-conducting triode whereby the common point of the input is near the potential of the more positive plate. As a result, a negative input pulse applied through capacitor C3 will be delivered, through capacitor C1 or C2, only to the more positive control grid. Thus, assuming triode T1 to be off or non-conducting and triode T2 to be on or conducting, device V1 will be biased so as to present a low impedance to an incoming negative pulse, whereas device V2 will be biased so as to present a high impedance to an incoming negative pulse. A negative pulse through capacitor C3 will therefore be blocked by device V2, but will pass device V1 and be applied through capacitor C1 to the grid of the conducting triode T2 to initiate the reversal of state of the trigger circuit. After the reversal, the anode voltage conditions will also have been reversed so that the next negative input pulse will be directed solely to the grid of tube T1, through capacitor C2. In this manner, the input pulses are directed to the two grids alternately.

It may be noted that the input may contain positive pulses interspersed with the negative, or useful, pulses. If a positive pulse does reach input terminal I1, for example, it will be greatly attenuated since that one of the devices V1 or V2 which is biased to be conductive will become less conductive when a positive pulse arrives. While the positive pulse obviously would not trigger the circuit, the trailing edge (which is negative in slope) of such a pulse might. However, such a trailing edge is suppressed by device V1 or V2 so as to obviate the possibility of false operation of the trigger circuit.

The change in potential of either anode of the trigger pair T1 and T2 may be utilized as the output of the stage. In the circuit of Fig. 1, the anode of tube T1 is coupled to the input I2 of the second or "2s" stage by capacitor C4. Since similar coupling exists among all of the stages, the several stages are serially connected, or connected in tandem. Consequently, were it not for the additional elements hereinafter to be described, the system of Fig. 1 would constitute a four-stage binary counter, registering the successively increasing powers of 2 in the successive stages, i. e., $2^0$ or "1s," $2^1$ or "2s," $2^2$ or "4s," and $2^3$ or "8s." Such a four-stage system would count through one full cycle and reset to zero in response to the receipt of $2^4$ or 16 pulses. Each stage may be characterized as "off" or in its "0" condition when the "0" tube such as T2 is non-conducting and the "1" tube such as T1 is conducting; and may be characterized as "on" or in its "1" condition when the "1" tube such as T1 is non-conducting and the "0" tube such as T2 is conducting. Employing that notation the normal four-stage binary counter would advance as follows in response to successive pulses:

*Table I*

| Input Pulse | Resulting Registry | | | |
|---|---|---|---|---|
| | "1s" Stage | "2s" Stage | "4s" Stage | "8s" Stage |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |
| 16 | 0 | 0 | 0 | 0 |

If the system of Fig. 1 consisted only of the elements hereinbefore described, i. e., if the input pulses were always applied through capacitor C3 and to input terminal I1, it would function in accordance with the above tabulation. Means are provided in the system of Fig. 1, however, to modify the operation of the elements so that the counter will revert to its initial condition at the tenth rather than at the sixteenth pulse. The circuit of Fig. 1 may therefore be termed a binary decade. This means comprises internally controlled input switching. A switching means, indicated generally as SW, functions under the control of the counter to connect the input pulse source selectively to various elements of the counter. Switch SW is shown to comprise, in its preferred form, a pair of varistors V3 and V4 controlled by voltages developed in the counter. However, all of the devices such as V1, V2, V3 and V4 may comprise any suitable rectifier, vacuum tube, gaseous discharge device, transistor, switch, or any other suitable device.

Figure 2:
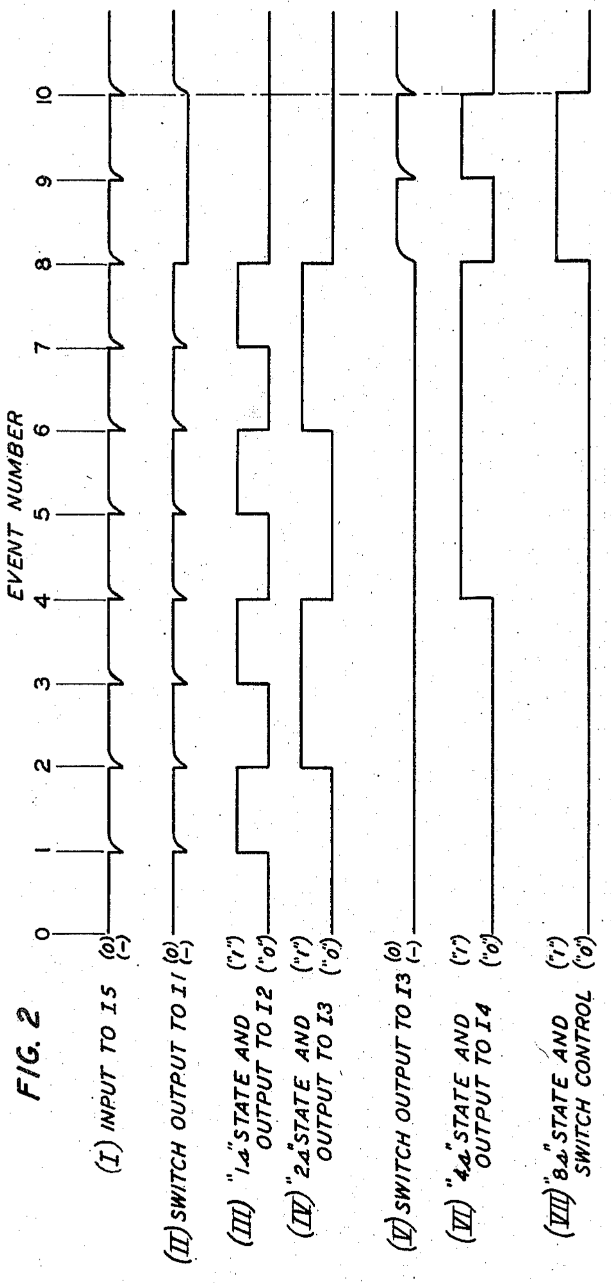
Fig. 2 is a representation of certain voltage-time relationships that occur in the circuit of Fig. 1.

One terminal of each of the devices V3 and V4 is connected both to a source of positive potential through resistor RB and to input terminal I5 to which the input pulses are applied, in the case of the system of Fig. 1, from an external source. The other terminal of device V3 is connected by capacitor C3 to input terminal I1 of the first or "1s" stage of section A. The other terminal of device V4 is connected by capacitor C7 to input terminal I3 of the first stage of section B, i. e., of the "4s" stage. Biasing potentials for selectively rendering one of the devices V3 or V4 conductive and the other non-conductive are derived from the last stage of section B, i. e., from the "8s" stage. Since the anode of either of the two tubes comprising any stage alternates between two potential conditions and since the voltage between the two anodes in any stage is substantially constant in amplitude but reversible in sign, the requisite biasing potentials for varistors V3 and V4 may be obtained from the anodes of the trigger circuit tubes. Thus the anode of the "1" tube T7 in the last stage of section B is connected through resistor R14 to varistor V4, and the anode of the "0" tube T8 in the last stage of section B is connected through resistor R15 to varistor V3. When the "8s" stage is in its "0" state or condition wherein the "0" tube T8 is non-conducting and the "1" tube T7 is conducting, the relatively high positive potential at the anode of the "0" tube T8 is applied to the arrow side of varistor V3, biasing varistor V3 so that it presents a low impedance to incoming negative pulses; and the less positive potential at the anode of the "1" tube T7 is applied to the arrow side of varistor V4, biasing varistor V4 so that it presents a high impedance to incoming negative pulses. Consequently, incoming negative pulses will be applied solely to the input terminal I1 of the first stage of section A. The system of Fig. 1 will, consequently, react to incoming pulses in the customary binary fashion as long as these conditions continue. Thus, assuming all stages initially to be in their "0" state, the first incoming pulse (Fig. 2, Graph I, Event No. 1) applied to input terminal I1 (Fig. 2, Graph II, Event No. 1) will cause the "1s" stage to shift to its "1" state (Fig. 2, Graph III, Event No. 1). The second pulse (Fig. 2, Graphs I and II, Event No. 2) will cause the "1s" stage to revert to its "0" state whereby a negative pulse will be applied through capacitor C4 to input terminal I2 (Fig. 2, Graph III, Event No. 2) to cause the "2s" stage to shift to its "1" state (Fig. 2, Graph IV, Event No. 2). The The system continues to function in the normal binary manner (Table I, supra, and Table II, infra) through the eighth pulse, at which time the "1s," "2s" and "4s" stages are in their "0" state (Fig. 2, Graphs III, IV and VI, Event No. 8) and the "8s" stage is, for the first time in the cycle, in its "1" state (Fig. 2, Graph VII, Event No. 8). As a result in this shift in state of the "8s" stage, the potentials at the anodes of tubes T7 and T8 are shifted whereby device V3 is biased so that it presents a high impedance to the incoming negative pulses and whereby device V4 is biased so that it presents a low impedance to the incoming negative pulses. Therefore, the incoming pulses will be applied solely through device V4 and capacitor C7 to input terminal I3 of the first stage of section B, i. e., the "4s" stage. The ninth incoming pulse (Fig. 2, Graph I, Event No. 9) will therefore not appear at input terminal I1 (Fig. 2, Graph II, Event No. 9), but will appear at input terminal I3 (Fig. 2, Graph V, Event No. 9), causing the "4s" stage to shift to its "1" state (Fig. 2, Graph VI, Event No. 9). The tenth incoming pulse (Fig. 2, Graph I, Event No. 10) will appear solely at input terminal I3 (Fig. 2, Graph V, Event No. 10), causing the "4s" stage to shift to its "0" condition (Fig. 2, Graph VI, Event No. 10), whereby a pulse will be transmitted from the "4s" stage through capacitor C6 to input terminal I4. The "8s" stage will therefore be shifted to its "0" state (Fig. 2, Graph VII, Event No. 10), whereby all four stages have now been returned to their initial condition of "0." It will be noted that upon the reversion of the "8s" stage to the "0" state the biasing potentials applied to switch SW will be again reversed so that the system of Fig. 1 is fully restored to its initial condition.

The successive conditions of the several stages of the counter of Fig. 1, after successive input pulses, may be tabulated as follows, using the system of notation introduced in Table I:

*Table II*

| Input Pulse | Resulting Registry | | | |
|---|---|---|---|---|
| | "1s" Stage | "2s" Stage | "4s" Stage | "8s" Stage |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 0 | 0 | 1 | 1 |
| 10 | 0 | 0 | 0 | 0 |

The principles involved in the determination of the number of sections and of the number of stages within each of the sections which are required to permit counting to any selected base may now be considered. The circuit of Fig. 1 has been stated to comprise two sections, section A and section B, and an internally controlled switching means SW. A generalized representation of these elements is shown as Fig. 3. Let the number of binary stages in section A be labeled $a$ and the number of stages in section B be labeled $b$. Starting with all stages registering "0," the input is applied through switch SW to section A. The registration advances in the normal binary fashion. When the first stage of section B first registers "1," all preceding stages register "0." The number of pulses received to create this condition is obviously $2^a$.

Figure 3:
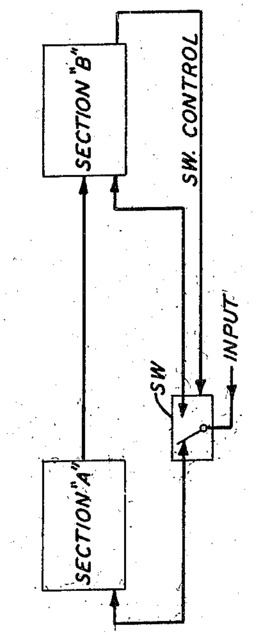
Fig. 3 is a diagrammatic representation of the circuit shown in Fig. 1 and also of a family of counters operable on certain other bases.

As pulses continue to arrive at the input of section A, the count proceeds in the normal binary manner until the last stage of section B first registers "1". In this process, section B received one pulse from the output of section A at the completion of each cycle of operation of section A. Therefore, the total pulse count at the time that the last stage of section B first registers "1" is $(2^a)(2^{b-1})$. The change of state of the last stage of section B controls switch SW, causing that switch to connect the pulse source to the input of the first stage of section B. Since section B already registers "1" on its final stage, $2^{b-1}$ additional pulses will be required to cause section B to complete its count, upon the receipt of which the counting cycle of the entire circuit will have been completed and all stages will again register "0." The cycle or base X of the circuit of Fig. 3 is therefore representable by the equation $$X=(2^a)(2^{b-1})+2^{b-1} \qquad (1)$$
$$=2^{a+b-1}+2^{b-1}$$

Any counting cycle which can be represented as the sum of two integral powers of 2 is possible with this two-section circuit. For example, if $a=1$ and $b=1$, the base is 3; if $a=2$ and $b=1$, the base is 5; if $a=1$ and $b=2$, the base is 6; if $a=3$ and $b=1$, the base is 9; if $a=2$ and $b=2$ the base is 10, and so on.

Figure 4:
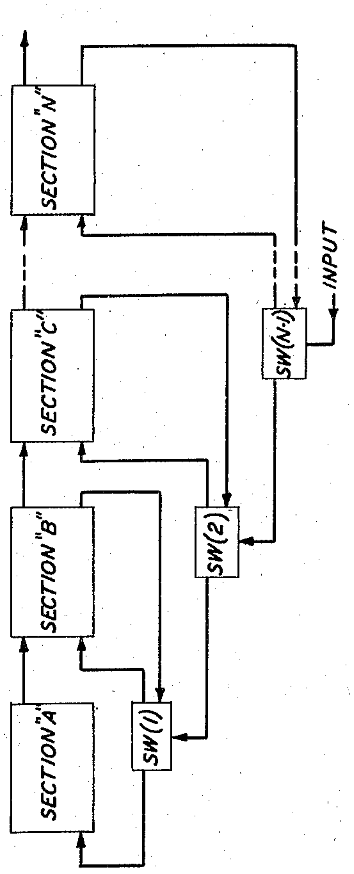
Fig. 4 is a diagrammatic representation of a system generalizing the principles of the invention.

Further generalization of the principles and the method for determining the number of sections and the number of stages per section for any base may conveniently be presented with reference to Fig. 4 which shows a counter comprising N sections, A, B, C . . . N, comprising $a$, $b$, $c$, etc. stages, respectively, for a total of $n$ stages, and $N-1$ switches SW(1), SW(2) . . . SW($N-1$). It may be noted that the portion of Fig. 4 comprising section A, section B and switch SW(1) is identical to Fig. 3. As each additional section is added serially, an additional switch is required, each additional switch functioning to apply pulses received at its input either to the input of the previous switch or to the input of the first stage of the added section, under the control of biasing signals developed in the last stage of the added section.

As above noted, after the receipt of a number of pulses equal to $(2^a)(2^{b-1})+2^{b-1}$, all stages in sections A and B read "0," the first stage of section C has been stepped to its "1" state, and switch SW(1) has been returned to its initial condition whereby incoming pulses are applied to the input of the first stage of section A. As pulses continue to arrive, the count builds up in the following manner:

$$X=[\{(2^a)(2^{b-1})+2^{b-1}\}\{2^{c-1}\}+2^{c-1}][2^{d-1}]+2^{d-1}\ .\ .\ .\ \text{etc.} \qquad (2)$$

or, $$X=2^{a+b-1+c-1+d-1+}\ .\ .\ .\ +2^{b-1+c-1+d-1+}\ .\ .\ .\ +2^{c-1+d-1+}\ .\ .\ .\ +2^{d-1+}\ .\ .\ .\ +\ .\ .\ .\ \text{etc.} \qquad (2a)$$

If N be the total number of sections and if the number of stages in the last or Nth section be represented by $l$, the expression of Equation (2$a$) becomes $$X=2^{a+b+c\ .\ .\ .\ +l-(N-1)}+2^{b+c\ .\ .\ .\ +l-(N-1)}+2^{c+d\ .\ .\ .\ +l-(N-2)}+2^{d+e\ .\ .\ .\ +l-(N-3)}+\ .\ .\ .\ +2^{l-1} \qquad (3)$$

Since any integral number may be represented as the sum of integral powers of the digit 2, the number X may be represented as follows, with exponents in descending order:

$$X=2^p+2^q+2^r+2^s\ .\ .\ .\ +2^z \qquad (4)$$

Then, from equations 3 and 4:

$$\begin{aligned} a+b+c\ .\ .\ .\ +l-(N-1)&=p\\ b+c\ .\ .\ .\ +l-(N-1)&=q\\ c+d\ .\ .\ .\ +l-(N-2)&=r\\ d+e\ .\ .\ .\ +l-(N-3)&=s\\ &\ \vdots\\ l-1&=z \end{aligned} \qquad (5)$$

Solving Equations 5 simultaneously:

$$\begin{aligned} a&=p-q\\ b&=q-r+1\\ c&=r-s+1 \end{aligned} \qquad (6)$$

$$d=s-t+1$$

$$\cdot$$
$$\cdot$$
$$\cdot$$

$$l=z+1$$

There are N Equations 6, each corresponding to a power of 2 in Equation 4; N is therefore the number of sections constituting a counter required to count to the base X, and $a$, $b$, $c$, etc. are the numbers of stages in the successive sections.

Therefore, to design a counter to any selected base the first step is to write the chosen base number as powers of 2 arranged in descending order. The number of terms in this expression is N, which is the number of sections required in the circuit. From the first one of Equations 6, the number of stages $a$ in the first section is the difference between the exponents of the first and the second of the terms in the expression. From the last one of Equations 6, the number of stages $l$ in the last section is the exponent of the last of the terms in the expression, plus 1. And from the intermediate Equations 6 the number of stages $b$, $c$, $d$, etc. in each of the intermediate sections is equal to the difference between the exponent of the term individual to that section and the exponent of the next succeeding term, plus 1. The switch or switches are then connected in accordance with the system of Fig. 4, i. e., the two output terminals of the first switch are connected to the inputs of the first stages of the first and second sections, respectively, and the control signals are derived from the last stage (which may also be the only and therefore the first stage) of the second section; the two output terminals of each additional switch are connected to the input of the previous switch and to the input of the first stage of the next succeeding section, respectively, and the control signals are derived from the last stage (which may also be the only and therefore the first stage) of the said next succeeding section; and the input of the last switch is connected to the external pulse source.

As an example of the application of these teachings, let a counter be designed which will count to the base 10:

$$10=2^3+2^1$$

Since there are two terms in Equation 7, N, the number of sections, is 2.

Per Equation 4:

$$p=3$$
$$q(\text{or } z)=1$$

Per Equations 6:

$$a=p-q=3-1=2 \text{ stages in the first section}$$

$$\left.\begin{array}{c} b=q-r+1=1-0+1= \\ \text{or} \\ l=z+1=1+1= \end{array}\right\} 2 \text{ stages in the second section}$$

and $n$, the total number of stages equals 2+2 or 4. Since $N-1$ switches are required, but one switch is needed, one output terminal of this switch being connected to the input of the first stage of the first section, which is the first of the four stages; the other output terminal of the switch being connected to the input of the first stage of the second section, which is the third stage; the control potentials being derived from the last stage of the second section, which is the fourth stage; and the input of the switch being connected to the pulse source.

This counter is represented in Fig. 1 of the drawings, and Fig. 3 is also a generalized representation of a counter to the base 10 (as well as others).

Other counters to any integral base may be readily devised in accordance with these teachings. The following tabulation represents a few examples, the information contained therein being obtained by application of the foregoing principles.

*Table III*

| X, the base | N, the number of sections (A, B, C, etc.) | $a$, $b$, :, etc. the number of stages in each of the sections A, B, C, etc., respectively | $n$, the total number of stages |
|---|---|---|---|
| 2 | 1 | $a=1$ | 1 |
| 3 | 2 | $a=1$; $b=1$ | 2 |
| 4 | 1 | $a=2$ | 2 |
| 5 | 2 | $a=2$; $b=1$ | 3 |
| 6 | 2 | $a=1$; $b=2$ | 3 |
| 7 | 3 | $a=1$; $b=2$; $c=1$ | 4 |
| 8 | 1 | $a=3$ | 3 |
| 9 | 2 | $a=3$; $b=1$ | 4 |
| 10 | 2 | $a=2$; $b=2$ | 4 |
| 11 | 3 | $a=2$; $b=2$; $c=1$ | 5 |
| 12 | 2 | $a=1$; $b=3$ | 4 |
| 13 | 3 | $a=1$; $b=3$; $c=1$ | 5 |
| 14 | 3 | $a=1$; $b=2$; $c=2$ | 5 |
| 15 | 4 | $a=1$; $b=2$; $c=2$; $d=1$ | 6 |
| 99 | 4 | $a=1$; $b=5$; $c=2$; $d=1$ | 9 |
| 100 | 3 | $a=1$; $b=4$; $c=3$ | 8 |
| 1000 | 6 | $a=1$; $b=2$; $c=2$ $d=2$; $e=3$; $f=4$ | 14 |

It should be noted that each of the conditions assumed by the system in counting to any given base X, i. e., in counting through one full cycle of its operation, is unique. It should also be noted that the system, when used as a frequency reducer, can be designed to give any integral ratio. It should also be noted that several counters designed in accordance with the herein presented principles may be connected in series if desired.

It is to be understood that the above-described arrangements are but illustrative of the application of the principles of the invention. Numerous other arrangements may be devised by those skilled in the art without departing from the spirit and scope of the invention.

What is claimed is:

1. A counter comprising a first and a second section, each of said sections comprising at least one stage, each of said stages having two stable states, at least one stage being adapted to alter the state of another stage only upon alternate changes of state of said one stage, a pulse source, first apparatus for connecting said pulse source to the first stage of said first section, second apparatus for connecting said pulse source to the first stage of said second section, and a control connection between the last stage of said second section and both said first and said second apparatus for controlling both said first and said second apparatus.

2. A counter comprising a first and a second section, each of said sections comprising at least one stage, each stage having an output, each of said stages having two stable states, at least one stage being adapted to alter the state of another stage only upon alternate changes of state of said one stage, a pulse source, first switching means for connecting said pulse source to one of said sections, second switching means for connecting said pulse source to the other one of said sections, and means for connecting both said first and said second switching means to said output of said second section.

3. A counter comprising a first and a second section, each of said sections comprising at least one stage, each of said stages having two stable states, at least one stage being adapted to alter the state of another stage only upon alternate changes of state of said only stage, a pulse source, first switching means for connecting said pulse source to the first stage of one of said sections, second switching means for connecting said pulse source to the first stage of the other of said sections, and means connecting both said first and said second switching means to the last stage of said second section for controlling both said first and said second switching means.

4. A counter comprising a first and a second section, each of said sections comprising at least one stage, each of said stages having two stable states, at least one stage being adapted to alter the state of another stage only upon alternate changes of state of said one stage, a pulse source, a first switching device connecting said pulse source to said first section, a second switching device connecting said pulse source to said second section, each of said devices having a conducting and a non-conducting condition, and means including only said second section for selectively biasing each of said devices to its conducting or non-conducting condition.

5. A counter comprising a first and a second section, each of said sections comprising at least one stage, each of said stages having two stable states, at least one stage being adapted to alter the state of another stage only upon alternate changes of state of said one stage, a pulse source, a first switching device connecting said pulse source to the first stage of said first section, a second switching device connecting said pulse source to the first stage of said second section, each of said devices having a conducting and a non-conducting condition, and means including only the last stage of said second section for selectively biasing each of said devices to its conducting or non-conducting condition.

6. A counter comprising a first and a second section, each of said sections comprising at least one stage, a pulse source, a first and a second switching device, each of said devices having a first and a second terminal and a conducting and a non-conducting condition, means connecting said pulse source to the first terminal of each of said devices, means connecting the second terminal of said first device to said first section, means connecting the second terminal of said second device to said second section, and means including said second section for selectively biasing each of said devices to its conducting or non-conducting condition.

7. A counter comprising a first and a second section, each of said sections comprising at least one stage, a first and a second switching device, each of said devices having a first and a second terminal and a conducting and a non-conducting condition, means connecting said pulse source to the first terminal of each of said devices, means connecting the second terminal of said first device to the first stage of said first section, means connecting the second terminal of said second device to the first stage of said second section, and means including the last stage of said second section for selectively biasing each of said devices to its conducting or non-conducting condition.

8. A counter comprising a first and a second section, each of said sections comprising at least one stage, a pulse source, a first and a second switching device, each of said devices having a first and a second terminal, means connecting said pulse source to the first terminal of each of said devices, means connecting the second terminal of said first device to the first stage of said first section, means connecting the second terminal of said second device to the first stage of said second section, and means connecting the last stage of said second section to said second terminal of each of said devices for controlling said devices.

9. A counter comprising a first and a second section, each of said sections comprising at least one stage, each of said stages having an input and an output, means for connecting the output of each of said stages to the input of the next succeeding one of said stages, a pulse source, a first and a second switching device, each of said devices having a first and a second terminal, means connecting said pulse source to the first terminal of each of said devices, means connecting the second terminal of said first device to the input of the first stage of said first section, means connecting the second terminal of said second device to the input of the first stage of said second section, and means connecting the output of the last stage of said second section to said second terminal of each of said devices for controlling said devices.

10. A counter comprising a first and a second section, each of said sections comprising at least one stage, each of said stages having an input and two outputs, means for connecting one output of each of said stages to the input of the next succeeding one of said stages, a pulse source, a first and a second voltage controlled switching device, each of said devices having a first and a second terminal, means connecting said pulse source to the first terminal of each of said devices, means connecting the second terminal of said first device to the input of the first stage of said first section, means connecting the second terminal of said second device to the input of the first stage of said second section, means connecting one output of the last stage of said second section to the second terminal of said first device, and means connecting the second output of the last stage of said second section to the second terminal of said second device.

11. A counter for counting to a base representable by the sum of a plurality of terms, each of said terms being a different integral power of the digit 2, comprising a plurality of sections, one section for each of said terms, each of said sections comprising at least one stage, a pulse source, apparatus for selectively connecting said pulse source to any of said sections, and means including at least one of the sections other than the first of said sections for controlling said apparatus.

12. A counter for counting to a base representable by the sum of a plurality of terms, each of said terms being a different integral power of the digit 2, comprising a plurality of secions, one section for each of said terms, each of said sections comprising at least one stage, a pulse source, apparatus for selectively connecting said pulse source to any of said sections, and means including all of said sections other than the first of said sections for controlling said apparatus.

13. A counter for counting to a base representable by the sum of a plurality of terms, each of said terms being a different integral power of the digit 2, comprising a plurality of sections, one section for each of said terms, each of said sections comprising at least one stage, each of said stages having an input and an output, a pulse source, apparatus for selectively connecting said pulse source to the input of the first stage in each of said sections, and means connecting the output of the last stage in each of said sections other than the first of said sections to said apparatus for controlling said apparatus.

14. A counter for counting to a base representable by the sum of a plurality of terms of successively decreasing magnitude, each of said terms being a different integral power of the digit 2, comprising a plurality of sections, one section for each of said terms, the first of said sections comprising a number of stages equal to the difference between the exponents of the first and the second of said terms, the last of said sections comprising a number of stages equal to the exponent of the last of said terms plus 1, each of the others of said sections comprising a number of stages equal to the difference between the exponent of the term individual thereto and the exponent of the next succeeding term plus 1, a pulse source, apparatus for selectively connecting said pulse source to any of said sections, and means including at least one of said sections other than the first of said sections for controlling said apparatus.

15. A counter for counting to a base representable by the sum of a plurality of terms of successively decreasing magnitude, each of said terms being a different integral power of the digit 2, comprising a plurality of sections, one section for each of said terms, the first of said sections comprising a number of stages equal to the difference between the exponents of the first and the second of said terms, the last of said sections comprising a number of stages equal to the exponent of the last of said terms plus 1, each of the others of said sections comprising a number of stages equal to the difference between the exponent of the term individual thereto and the exponent of the next succeeding term plus 1, each of said stages having an input and an output, a pulse source, apparatus for selectively connecting said pulse source to the input of the first stage in each of said sections, and means connecting the output of the last stage in each of said sections other than the first of said sections to said apparatus for controlling said apparatus.

16. A counter for counting to a base representable by the sum of a plurality of terms of successively decreasing magnitude, each of said terms being a different integral power of the digit 2, comprising a plurality of sections, one section for each of said terms, the first of said sections comprising a number of stages equal to the difference between the exponents of the first and the second of said terms, the last of said sections comprising a number of stages equal to the exponent of the last of said terms plus 1, each of the others of said sections comprising a number of stages equal to the difference between the exponent of the term individual thereto and the exponent of the next succeeding term plus 1, each of said stages having an input and two outputs, means for connecting one output of each of said stages to the input of the next succeeding one of said stages, a pulse source, apparatus for selectively connecting said pulse source to the input of the first stage in each of said sections, and means connecting both outputs of the last stage in each of said sections other than the first of said sections to said apparatus for controlling said apparatus.

17. A counter comprising a plurality of binary stages, each stage having two stable states, means responsive to alternate changes of state of one stage for altering the state of a succeeding stage, a pulse source, first apparatus for connecting the said pulse source to a preselected one of said stages, second apparatus for connecting said pulse source only to a different preselected one of said stages, and means comprising only a predetermined one of said stages for controlling both said first and said second apparatus.

18. A counter comprising a first and a second group of binary stages, each of said stages having two stable states, means responsive to alternate changes of state of one stage for altering a state of another stage, a pulse source, first apparatus for connecting said pulse source only to one of said groups, second apparatus for connecting said pulse source only to the other one of said groups, and means connecting only said second group to said first and said second apparatus for controlling both said first and said second apparatus.

References Cited in the file of this patent

UNITED STATES PATENTS

| | | |
|---|---|---|
| 2,521,789 | Groddoff | Sept. 12, 1950 |
| 2,697,549 | Hobbs | Dec. 21, 1954 |

OTHER REFERENCES

"Third Interim Progress Report," Bigelow et al., Institute for Advanced Study, Princeton, N. J., January 1, 1948; Drawing C-3-1036, page 131.

"Third Interim Report on the Physical Realization of an Electronic Computing Instrument," published by the Institute for Advanced Study, Princeton, New Jersey; January 1, 1948, pages 126-138.

"The Versatile Binary Scaler," Schmidt, Radio and Television News, August 1951, Figure 9, page 18.